United States Patent [19]

Kada

[11] Patent Number: 4,927,311
[45] Date of Patent: May 22, 1990

[54] SHIP UNLOADER WITH SCREW CONVEYOR SWINGABLE IN VARIOUS PLANES

[75] Inventor: Yoshio Kada, Niihama, Japan

[73] Assignee: Sumitomo Heavy Industries, Ltd., Tokyo, Japan

[21] Appl. No.: 228,662

[22] Filed: Aug. 5, 1988

[30] Foreign Application Priority Data

Aug. 18, 1987 [JP] Japan .................... 62-203448

[51] Int. Cl.$^5$ ............................. B65G 67/60
[52] U.S. Cl. ...................... 414/140.7; 414/141.4
[58] Field of Search ............ 414/140.7, 141.9, 141.4, 414/142.6, 140.4; 198/518, 519

[56] References Cited

U.S. PATENT DOCUMENTS

| 1,058,306 | 4/1913 | Kindl | 414/141.5 X |
| 3,640,376 | 2/1972 | Peuker et al. | 198/519 X |
| 4,020,953 | 5/1977 | Eklof et al. | 414/141.4 |
| 4,152,029 | 5/1979 | Cowpertwait | 414/141.9 X |
| 4,738,578 | 4/1988 | Johnston | 198/518 X |
| 4,755,094 | 7/1988 | Kaucic | 414/140.7 |

FOREIGN PATENT DOCUMENTS

| 0114783 | 7/1982 | Japan | 414/141.9 |
| 59-32377 | 8/1984 | Japan. | |
| 0248826 | 11/1986 | Japan | 414/141.4 |
| 8402112 | 6/1984 | World Int. Prop. O. | 414/140.7 |

OTHER PUBLICATIONS

The 1986 Loadstar Bulk Handling Directory.

*Primary Examiner*—Robert J. Spar
*Assistant Examiner*—William M. Hienz
*Attorney, Agent, or Firm*—Armstrong, Nikaido, Marmelstein, Kubovcik & Murray

[57] ABSTRACT

An unloader having a vertical screw conveyer suspended from the head of the boom for conveying bulk cargoes from a ship, and a boom conveyer disposed above the boom for conveying the cargoes to the ground. The vertical screw conveyer is not only swingable within a plane parallel to the boom-hoisting plane but also able to pivot about the axis of the boom. Thus, this arrangement makes the vertical screw conveyer swingable in two directions. Accordingly, the vertical screw conveyer can reach locations below a hatch both in the transverse direction of the ship and in the longitudinal directions thereof, thereby enhancing the efficiency of unloading operation particularly with respect to these locations which have been out of reach with a conventional unloader.

1 Claim, 3 Drawing Sheets

SHIP UNLOADER WITH SCREW CONVEYOR SWINGABLE IN VARIOUS PLANES

BACKGROUND OF THE INVENTION

The present invention relates to an unloader suitable for stevedoring cargoes, especially bulk cargoes to be conveyed, from ships.

In a conventionally known unloader with a vertical screw conveyer, although the screw can swing in the direction parallel with the plane along which the boom is hoisted, it has been unable to swing in the direction perpendicular to the plane and the boom.

However, in cases where cargoes of certain types or in certain conditions are involved, it is desired that the screw be capable of swinging also in the direction perpendicular to the boom, because this would be more convenient and more efficient in such cases.

In order to satisfy the above-stated requirement, an arrangement has been proposed in which the entire boom is adapted to tilt so as to enable the screw to swing in the direction perpendicular to the boom. However, this arrangement requires a complicated tilting mechanism, thereby causing an increase in equipment costs.

SUMMARY OF THE INVENTION

The present invention has been accomplished to improve the conventionally known unloaders. It is an object of the present invention to provide an unloader which is capable of operating efficiently and is simple in structure, but which is inexpensive.

To this end, according to the present invention, there is provided an unloader comprising: a boom; a boom conveyer disposed above the boom in such a manner as to extend in the longitudinal direction of the boom; a screw supporting frame mounted above the head of the boom in such a manner as to be also to pivot about the boom conveyer; and a vertical screw conveyer supported by the screw supporting frame in such a manner as to be swingable within a plane which is substantially parallel with a plane including the axis of rotation of the screw supporting frame.

The arrangement, operation, and effect of the present invention will be more apparent from the following description of the preferred embodiment thereof when read in connection with the accompanying drawings.

DESCRIPTION OF THE PREFERRED EMBODIMENT

Figure 1:
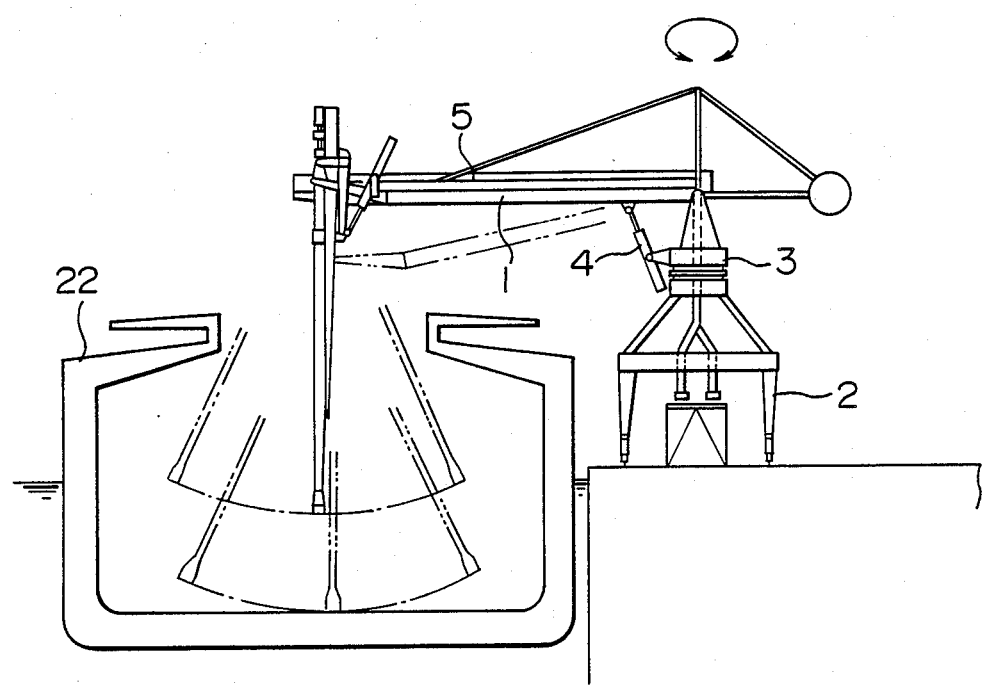
FIG. 1 is a side view schematically showing an unloader in accordance with the present invention.
Figure 2:
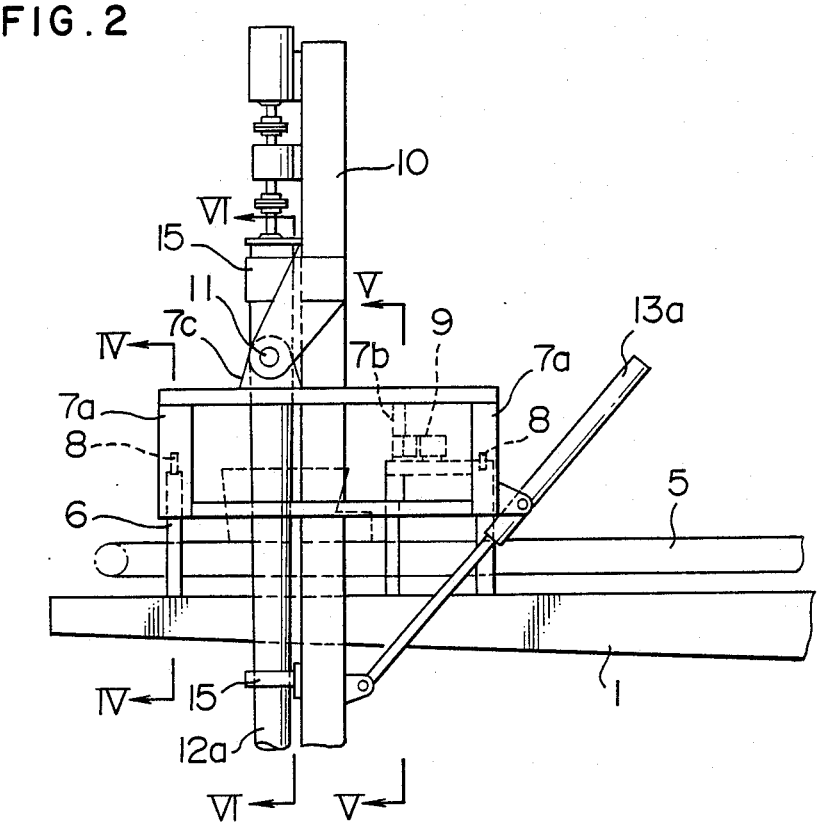
FIGS. 2 and 3 are a side view and a plan view, respectively, showing the structure of the head portion of a boom of the unloader shown in FIG. 1.
Figure 3:
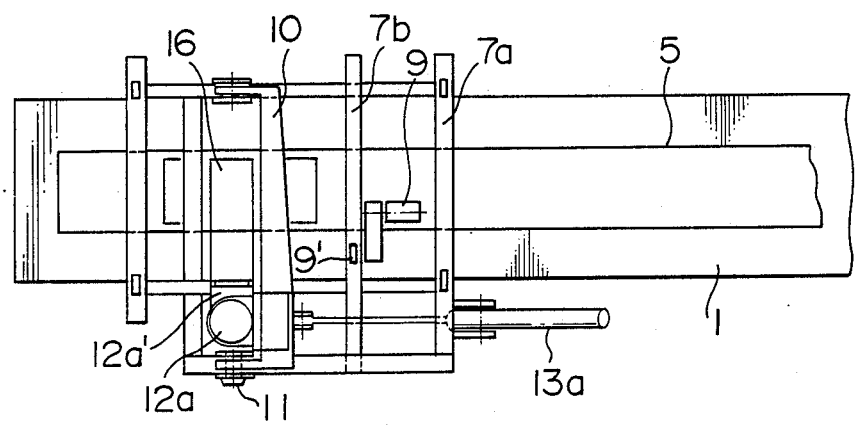
Figure 4:
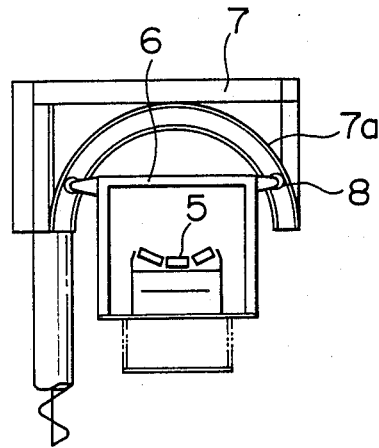
FIG. 4 is a front sectional view taken along the line IV—IV shown in FIG. 2.
Figure 6:
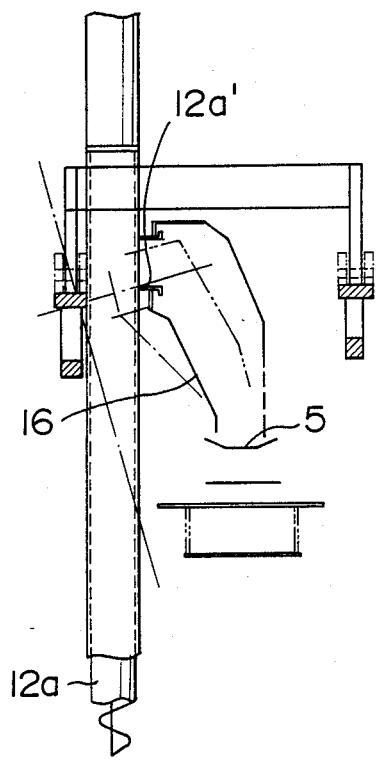
FIG. 6 is a front sectional view taken along the line VI—VI shown in FIG. 2.
Figure 5:
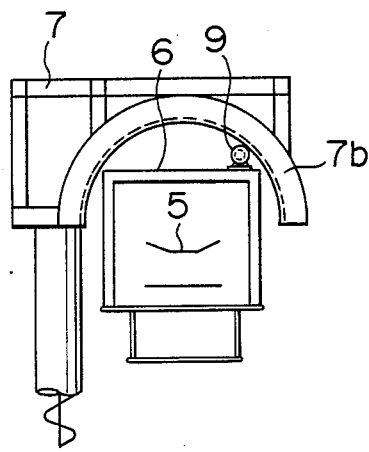
FIG. 5 is a front sectional view taken along the line V—V shown in FIG. 2.

FIGS. 1 to 6 illustrate one preferred embodiment of the present invention. As shown in the drawings, a boom 1 is pivotally mounted on a rotary frame 3 disposed on a movable stock 2 and can be hoisted by a hoisting device 4. A portal-shaped frame 6 is mounted on a head portion of the boom 1 in a saddle-like manner, more specifically in such a manner as to extend across and over a boom conveyer 5. A screw supporting frame 7 having a swinging mechanism, described later, is superposed on the frame 6.

The swinging mechanism of the screw supporting frame 7 comprises circular-arc rails 7a disposed in engagement with rollers 8 provided at the upper ends of the frame 6, an electric drive motor 9 mounted on the frame 6 for causing swinging, and a circular-arc pinion rack 7b disposed in meshing engagement with a pinion fitted into an end of the shaft of the motor 9. The circular-arc rails 7a and the pinion rack 7b form a structure integral with the screw supporting frame 7. The virtual center of the circular-arc rails 7a is located in the vicinity of the conveyance surface of the boom conveyer 5.

A vertical screw conveyer 12a is secured to a mounting frame 10. The frame 10 is swingably supported, via pins 11, by brackets 7c provided on upper portions of the screw supporting frame 7. A scattered commodity discharge port 12a' is provided at an upper end portion of the vertical screw conveyer 12a and is disposed concentrically with the pins 11. The tip of a piston rod of a swinging cylinder 13a is linked to the mounting frame 10. An upper portion and a lower portion of the vertical screw conveyer 12a, mounted on the mounting frame 10, are tightly clamped by mounting pieces 15.

A movable chute 16 is supported by the screw supporting frame 7 and is connected to the discharge port 12a' of the screw conveyer 12a. The movable chute 16 is adapted to tiltingly swing together with the screw supporting frame 7 when it is driven by the electric motor 9.

The unloader in accordance with the present invention has the above-described construction. Next, the operation of the unloader will be described.

When it is necessary to unload bulk cargoes from a hatch of a ship 22, the unloader is moved to a position near the ship 22. The boom 1 is rotated and is vertically moved so as to allow the vertical screw conveyer 12a suspended from the head of the boom 1 to extend into the hatch of the ship, and an operation of unloading the bulk cargoes is performed.

During the unloading operation, when it is necessary to insert the vertical screw conveyer 12a further down into the hatch in the transverse direction of the ship and in the longitudinal direction thereof, the swinging mechanism members 7a and 7b and the swinging cylinder 13a are employed in such a manner as to swing the screw conveyer 12a until the tip of the screw conveyer 12a comes into contact with the cargoes. Thereafter, the unloading operation is continued.

According to the invention, the vertical screw conveyer suspended from the head of the boom can be swung both within the plane along which the boom is hoisted and in the direction perpendicular to this plane. Accordingly, it is possible to insert the tip of the vertical screw conveyer into a desired location below the deck of the ship, thereby enabling an efficient unloading of part of a cargo which hitherto has not been successfully unloaded. Thus, the above-described arrangement of the present invention is very effective in increasing the efficiency of unloading operation. In addition, the structure of the unloader is very simple, and the swinging mechanism can be provided at low costs.

What is claimed is:

1. An unloader comprising: a boom having a head end; a boom conveyer disposed above said boom in such a manner as to extend in the longitudinal direction of said boom; a screw supporting frame mounted above the head end of said boom in such a manner as to be able to pivot about a longitudinal axis of said boom conveyor; a vertical screw conveyer supported by said screw supporting frame in such a manner as to be swingable within a plane which is substantially parallel with a plane including the axis of rotation of said screw supporting frame; a portal-shaped frame supported on the head end of said boom in such a manner as to extend across and over said boom conveyer, said portal-shaped frame having upper opposite ends and being provided with rollers at said upper opposite ends; and an electric motor supported above said boom and having a shaft one end of which a pinion is fitted into; said screw supporting frame having circular-arc rails disposed in engagement with said rollers, and a circular-arc rack disposed in parallel with said rails and in meshing engagement with said pinion.

* * * * *